Sept. 9, 1952   F. A. FICHTMUELLER   2,609,859
METHOD AND APPARATUS FOR BENDING PIPE
Filed May 19, 1948   2 SHEETS—SHEET 1
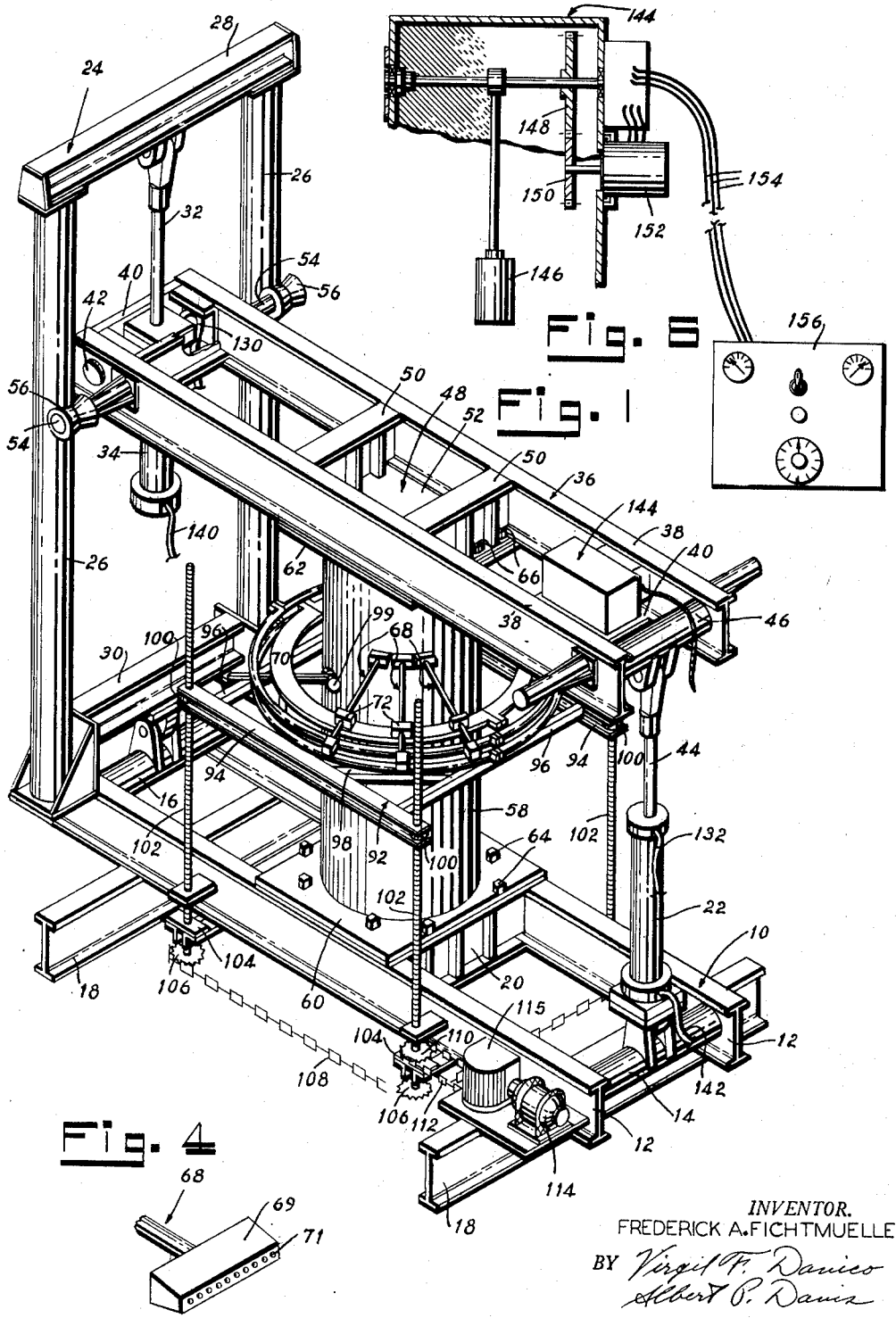
INVENTOR.
FREDERICK A. FICHTMUELLER
BY Virgil F. Danico
Albert P. Davis
ATTORNEYS Sept. 9, 1952  F. A. FICHTMUELLER  2,609,859
METHOD AND APPARATUS FOR BENDING PIPE
Filed May 19, 1948  2 SHEETS—SHEET 2
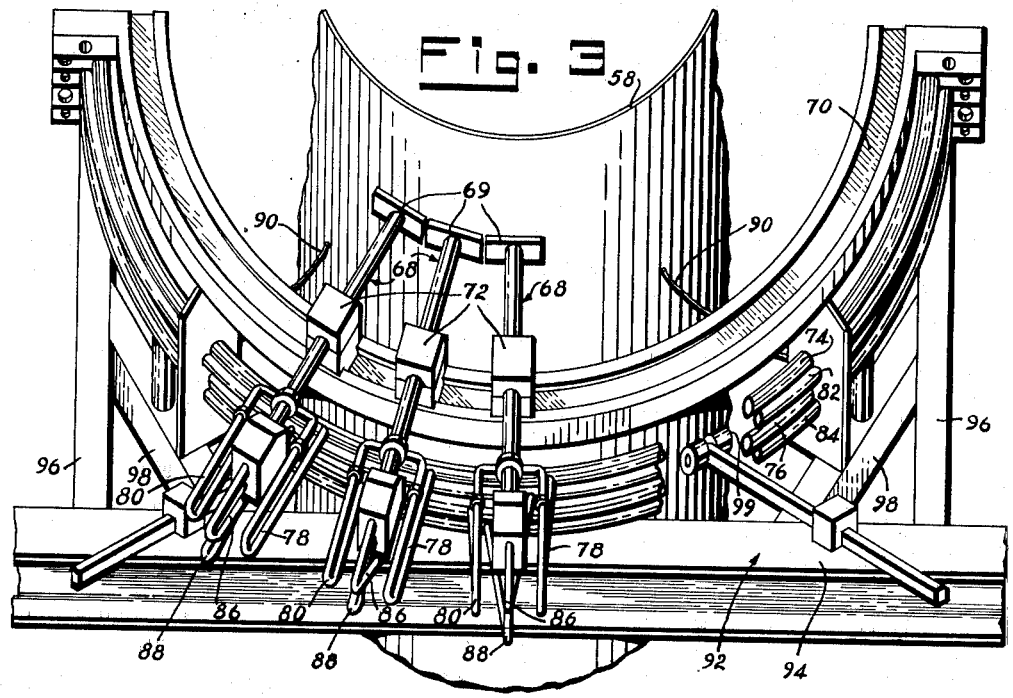
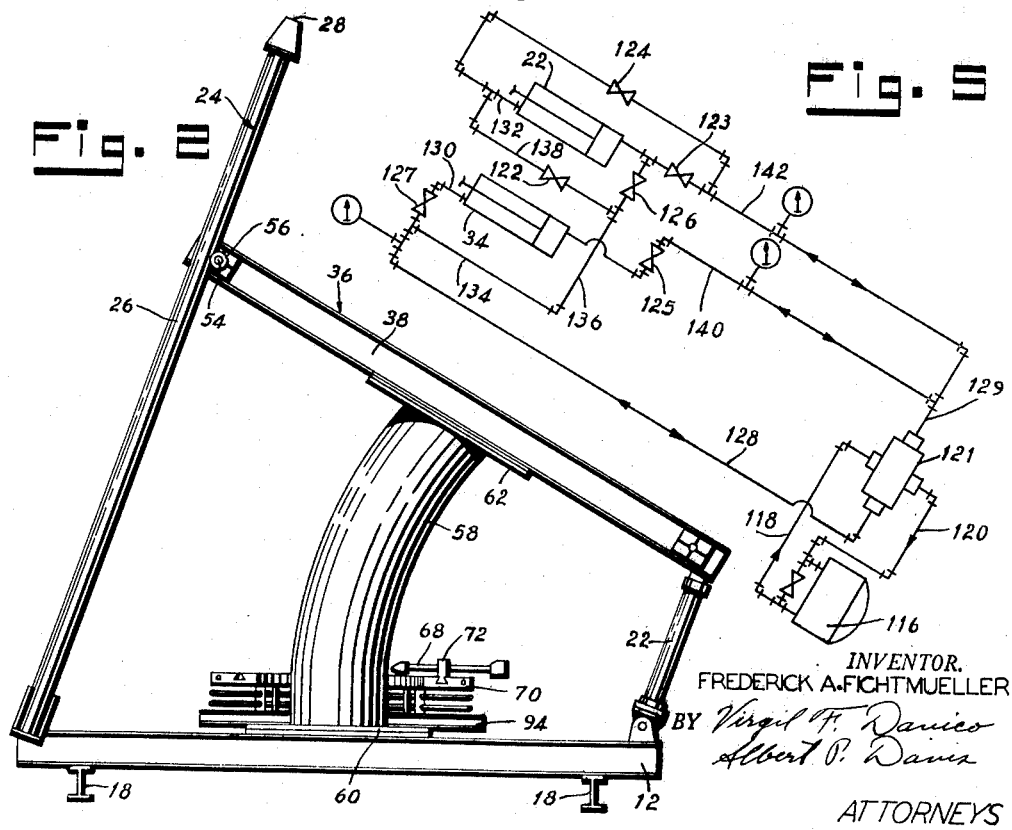
INVENTOR.
FREDERICK A. FICHTMUELLER
BY Virgil F. Danico
Albert P. Davis
ATTORNEYS Patented Sept. 9, 1952

2,609,859

UNITED STATES PATENT OFFICE 2,609,859

METHOD AND APPARATUS FOR BENDING PIPE

Frederick A. Fichtmueller, Staten Island, N. Y., assignor to The M. W. Kellogg Company, Jersey City, N. J., a corporation of Delaware Application May 19, 1948, Serial No. 27,978

7 Claims. (Cl. 153—40)

This invention relates to a method and apparatus for bending pipe, and more particularly to a method and apparatus for making accurate bends in pipe of relatively large diameter and maintaining the circular cross section of said pipe throughout the bend without the use of auxiliary supporting means.

The present invention is an improvement on the method disclosed in the copending application Serial No. 679,900, filed June 28, 1946, by David B. Rossheim, et al., for Method of Bending Thin Walled Thermoplastic Bodies Including Tubes, issued as Patent No. 2,480,774 on August 30, 1949. The present invention also includes a preferred apparatus for carrying out the improved method.

The above mentioned Patent No. 2,480,774, discloses a method of bending thermoplastic bodies by sequentially heating predetermined narrow areas of said bodies and causing a plastic flow of the material comprising the heated area to take place in said areas as they attain a predetermined temperature, whereby the adjacent cool material functions to prevent undesirable distortion of the heated material.

The present invention comprises a method and apparatus for sequentially heating predetermined narrow circumferential bands of a pipe and bending each of said bands as they attain a predetermined temperature by the application of a substantially pure bending moment to said heated bands, said bending moment being in the plane of the bend imposed on said pipe.

It is accordingly one object of the present invention to provide a method and apparatus for hot-working pipe in which a predetermined area of the pipe is heated and uniform plastic deformation of the heated pipe is obtained by the application of a substantially pure bending moment thereto.

Another object of the present invention is to provide a method and apparatus for bending pipe in which a plurality of predetermined circumferential areas of the pipe are sequentially heated to a predetermined temperature and subjected to a substantially pure bending moment to cause a plastic flow of the material thereof to take place.

Another object of the present invention is to provide a method and apparatus for bending pipe in which a plurality of circumferential bands of predetermined width on a pipe to be bent are rapidly heated sequentially to a predetermined temperature so that substantially the full width of each band is at a uniform temperature, and the material of the pipe adjacent each heated band is at predetermined lower temperature, and wherein each heated band is subjected to a substantially pure bending moment to cause a plastic flow of the heated material thereof.

Another object of the present invention is to provide a method and apparatus for bending pipe wherein a plurality of circumferential increments of a pipe are bent in a predetermined sequence and wherein the only appreciable force acting on said increments to bend them is a couple.

Other objects of the invention will in part be obvious and will in part appear hereinafter.

The invention accordingly comprises the process involving the several steps and the relation and the order of one or more of such steps with respect to each of the others and the apparatus possessing the construction, combination of elements and arrangements of parts which are exemplified in the detailed disclosure, and the scope of the application which will be indicated in the claims.

For a fuller understanding of the nature and objects of the invention, reference should be had to the following detailed description taken in connection with the accompanying drawings wherein:

Figure 1 is a somewhat diagrammatic perspective view of a preferred form of pipe bending apparatus with a length of pipe located therein prior to bending;

Figure 2 is a somewhat diagrammatic side view of the apparatus of Figure 1 showing the position of the apparatus after the length of pipe has been bent;

Figure 3 is a somewhat diagrammatic fragmentary perspective view showing details of the burner assembly;

Figure 4 is a detail view of one burner head;

Figure 5 is a schematic diagram illustrating the manner in which the hydraulic system of the apparatus operates; and Figure 6 is a diagrammatic view of an instrument for measuring and indicating the amount of bend that is imparted to each circumferential band of the pipe.

The method of the present invention for bending a length of pipe comprises holding a piece of pipe at one side of the length or portion thereof that is to be bent, sequentially heating a plurality of narrow circumferential bands of predetermined width of said pipe to a substantially uniform predetermined temperature to render the material comprising each of the heated bands relatively plastic and capable of uniform plastic flow when subjected to a predetermined shaping force, maintaining the material of said pipe comprising the area adjacent said heated bands relatively cool and sufficiently rigid to resist permanent deformation when subjected to said predetermined force, and sequentially applying a substantially pure bending moment to each of said heated bands of sufficient magnitude to cause uniform plastic flow of the material comprising said heated bands to take place. The heated circumferential band is supported by the relatively cool adjacent areas of the pipe, which serve to control shaping of said bands. The width of the heated bands bears a predetermined relation to the wall thickness of the pipe, the natural buckling wave length of the wall of the pipe, the diameter of the pipe, and the percentage of deformation that is to be imposed on the pipe in acquiring the desired bend, so that a minimum amount of unwanted distortion is obtained in each heated band as it is deformed.

The apparatus of the present invention for bending a length of pipe comprises means for rigidly holding a length of pipe, means for rapidly heating a plurality of circumferential bands of predetermined width of said pipe, one after the other, to a substantially uniform predetermined temperature, and means for applying a substantially pure bending moment of predetermined intensity to said pipe to bring about a desired uniform plastic flow of the heated material comprising each of said circumferential bands.

Figure 1 is a somewhat diagrammatic perspective view of the apparatus of the present invention. The apparatus comprises a base 10 made up of two parallel I-beams 12 which are spaced a predetermined distance apart by spacing and stress taking members 14 and 16, located adjacent the ends of I-beams 12. The I-beams 12 may be supported by any suitable foundation; however, in the apparatus as disclosed in Figure 1, this foundation comprises a pair of I-beams 18 positioned at right angles to, and adjacent the ends of, I-beams 12. A pipe supporting platform 20 is located at approximately the midpoint of I-beams 12 and equally spaced from the two spacing and stress taking members 14 and 16. A hydraulic cylinder 22, is hingedly mounted in a vertical position on the midpoint of spacing and stress taking member 14.

A structural frame 24 is hingedly mounted in a vertical position on the midpoint of spacing and stress taking member 16. Frame 24 comprises a pair of vertical stanchions 26, which are tied together by horizontal members 28 and 30. Frame 24 is hingedly connected to spacing and stress taking member 16 at the midpoints of horizontal member 30 and spacing and stress taking member 16. The ram 32 of a hydraulic cylinder 34 is hingedly attached to the midpoint of horizontal member 28 and said ram 32 and said hydraulic cylinder 34 depend therefrom in a normally vertical direction. Hydraulic cylinder 34 is preferably substantially identical to hydraulic cylinder 22, but in any event it is of such proportions that it is capable of exerting a force equal to the force exerted by hydraulic cylinder 22 when activated by the same hydraulic pressure.

A stress applying member 36 comprising a pair of substantially parallel I-beams, 38, connected by structural members 40, is pivotally connected at one end to the upper end of hydraulic cylinder 34 by means of hinge pins 42, and hingedly attached at its other end to ram 44 of hydraulic cylinder 22 by means of bridging member 46. A pipe contacting platform 48 is provided at approximately the midpoint of stress applying member 36 and equally spaced from hinge pins 42 and bridging member 46. Pipe contacting platform 48 comprises a pair of parallel cross braces 50, and a plate 52, which covers the lower side of the opening bounded by I-beams 38 and cross braces 50. A pair of stub shafts 54 are attached to the sides of stress applying member 36 adjacent to hinge pins 42. Stub shafts 54 extend at right angles from I-beams 38 and in the center plane of stress applying member 36. A grooved roller 56 is rotatably carried by the end of each of shafts 54. Grooved rollers 56 are spaced apart a distance equal to the spacing of stanchions 26, and stub shafts 54 are spaced from hinge pins 42 a distance such that when hydraulic cylinder 34 is parallel to stanchions 26 rollers 56 are in rolling contact with said stanchions 26. Stub shafts 54 and rollers 56 function to keep hydraulic cylinder 34 parallel with stanchions 26 when the apparatus is in operation as will become more apparent later.

The distance between hinge pins 42 and bridging member 46, to which hydraulic cylinders 34 and 22 are respectively attached, and through which said cylinders transmit forces to stress applying member 36, is substantially identical to the distance between spacing and stress taking members 14 and 16. The two cylinders 22 and 34 are also so connected to base 10 and stress applying member 36 that a length of pipe placed in the apparatus is located with its center line in the same plane as the two forces exerted by cylinders 22 and 34. It will thus be seen that when stress applying member 36 is parallel to base 10 with pipe contacting platform 48 above pipe platform 20 the two hydraulic cylinders 22 and 34 are parallel to each other and will exert equal forces in opposite directions.

A length of pipe 58 which is to be bent is shown positioned in the apparatus of the present invention. Pipe 58 is mounted in the apparatus by first welding, or otherwise securing, one of its ends to a base plate 60, and welding, or otherwise securing, its other end to an upper plate 62. After plates 60 and 62 have been secured to the ends of pipe 58, the pipe is placed in a vertical position on pipe platform 20, with holes in base plate 60 in alignment with holes in pipe platform 20 and base plate 60 is securely fastened, by means of bolts 64, to said pipe platform. Stress applying member 36 is then lowered onto pipe 58, with holes in pipe contacting platform 48 in alignment with holes in upper plate 62, and the two are securely fastened together by means of bolts 66.

A ring of water cooled oxy-acetylene burners 68 surrounds, or encircles, pipe 58. To avoid confusing the drawing only three of the burners 68 are shown in Figure 1, but it will be understood that a sufficient number of burners are provided so that their tips 69 extend around the circumference of the pipe in a substantially unbroken ring. Each burner tip 69 is preferably provided with a single row of apertures 71. Each of the burners 68 is mounted on a ring 70 by means of blocks 72 which adjustably hold burners 68 for movement towards or away from pipe 58, so that said burners 68 can be adjusted to form a ring around pipes of different diameters. Ring 70 also carries manifolds 74 and 76 which conduct oxygen and acetylene respectively to burner supply tubes 78 and 80. Manifolds 82 and 84, also carried by ring 70, conduct cooling water to and away from burners 68. Cooling water is conducted from manifold 82 to burners 68 by means of tubes 86, and the cooling water is conducted from burners 68 to manifold 84 by means of tubes 88. A plurality of pilot flames are maintained adjacent the surface of pipe 58 and tips 69 of burners 68 by means of a plurality of flexible tubes 90 which conduct acetylene from manifold 76. Ring 70 and manifolds 74, 76, 82 and 84 are formed in two sections so that the assemblage can be put in place around a pipe after the pipe has been positioned in the apparatus.

The above described burner is carried for vertical movement along the circumference of pipe 58 by a rectangular frame 92 comprising two parallel channel members 94 connected to each other by cross members 96 and corner strut members 98 connected to channel members 94 and cross members 96. Both ends of each of parallel channel members 94 are provided with a threaded collar or nut 100, and each collar or nut 100 threadedly engages a vertically positioned screw rod 102. The lower ends of screw rods 102 pass through and are supported by thrust bearings 104, and are provided at their lower ends with substantially identical sprocket wheels 106. An endless sprocket chain 108, passes around and is enmeshed with each sprocket wheel 106. One of the screw rods 102 is provided with a second sprocket wheel 110. A second sprocket chain 112, which is driven by a reversible motor 114 through speed reducing device 115, rotates sprocket wheel 110, the screw rod to which it is attached, and its sprocket wheel 106. In this manner sprocket chain 108 is driven and the screw rods 102 are rotated in unison. It will thus be seen that burners 68 can be lowered or raised along pipe 58 any desired amount and at any desired speed by controlling the direction and speed of rotation of motor 114, or the speed at which sprocket chain 112 moves by means of speed reducing device 115. A plurality of rollers 99 are adjustably mounted on frame 92 for movement in a radial direction towards and away from pipe 58. Rollers 99 are adjusted to lightly contact the wall of pipe 58 and function to steady frame 92 and to hold burners 68 a predetermined distance from said pipe 58.

Figure 5 illustrates schematically the hydraulic system of the apparatus. Pipes 118 and 120 comprise, respectively, a feed line from the pump 116 to master valve 121, and a return line from master valve 121 to the pump 116. When master valve 121 is closed so that cylinders 22 and 34 are inoperative, the supply of hydraulic fluid provided by pump 116 passes through pipe 118 into valve 121 and returns directly therefrom to pump 116 through pipe 120. When master valve 121 is opened to cause hydraulic cylinders 22 and 34 to operate, the hydraulic fluid passes from the pump 116 through pipe 118 into master valve 121 and from there into the system, and the return fluid from the system passes through valve 121 and back into pump 116 through pipe 120. The hydraulic system is so set up that either cylinder can be operated independently in either direction, or the two cylinders can be operated together, either in the same direction or in opposite directions. As the apparatus of the present invention is normally used during its bending cycle, the hydraulic system is so adjusted that rams 32 and 44 move into their respective cylinders. Therefore, valves 124 and 126 are closed, the remainder of the valves in the system are opened, and master valve 121 is adjusted to cause hydraulic fluid entering it through pipe 118 to leave through pipe 128. From pipe 128 the hydraulic fluid enters the hydraulic cylinder 34 through pipe 130 and enters hydraulic cylinder 22 through pipe 132 after passing through pipes 134, 136 and 138 respectively. Hydraulic fluid leaving the lower part of the cylinders 22 and 34 is returned to the master valve 121 through pipes 140 and 142. Rams 32 and 44 are caused to move out of their respective cylinders by changing the adjustment of master valve 121 so that hydraulic fluid entering it through pipe 118 leaves through pipe 129 thus reversing the above described direction of flow. To cause ram 32 to move out of cylinder 34 and ram 44 to move into cylinder 22 valves 122 and 123 are closed, the remainder of the valves in the system are opened, and master valve 121 is adjusted to cause hydraulic fluid entering it through pipe 118 to leave through pipe 129. Opposite motion of rams 32 and 44 is accomplished by adjusting master valve to cause the fluid entering it to leave by pipe 128. Valves 125 and 127 are only closed when it is desired to operate a single cylinder, and the manner in which these valves, and all of the other valves in the system, are adjusted to accomplish this will be apparent to one skilled in the art.

Although the method and apparatus of the present invention can be adapted to bending pipes of any diameter, it is primarily intended for use in bending large diameter pipes, as for example, pipes from 30 inches in diameter to 60 inches in diameter and ranging up to 30 feet in length. Therefore the apparatus is preferably constructed of such a size that stress applying member 36 can be positioned at such a height that a 30-foot length of pipe can be positioned between pipe platform 20 and pipe contacting platform 48.

To carry out the method of the present invention, a length of pipe 58 is positioned in said apparatus in the above described manner, the ring of burners 68 is raised until their tips 69 are even with the uppermost point on the pipe that is to be bent, and burners 68 are ignited.

Burners 68, by means of motor 114 and screw rods 102, are caused to oscillate vertically back and forth along the circumference of the pipe for a distance equal to the width of the circumferential band that it is desired to heat. By causing the ring of burners 68 to travel back and forth along the pipe, the material comprising the circumferential band being heated is brought to a substantially uniform temperature throughout its full width. Because of the high heat output of oxyacetylene burners 68 the circumferential band attains its desired uniform temperature very quickly and as a result there is not sufficient time for the material of pipe 58 immediately adjacent the circumferential band to acquire a high temperature by conduction from said band, and the temperature gradient of said adjacent material sharply slopes away from said band. At the same time that burners 68 start to heat a circumferential band, master valve 122 is opened to actuate both hydraulic cylinders 22 and 34. Cylinder 22 exerts a downward pull on the end of stress applying member 36 and cylinder 34 exerts an upward pull on the other end of member 36. Inasmuch as the force applied by each cylinder is substantially equal and parallel to the other, and the two forces are exerted in opposite directions the result of these two forces is a substantially pure bending moment around the centroidal axis of the circumferential band being heated. As the circumferential band being heated attains a predetermined temperature whereat it is plastic and capable of uniform plastic flow under the forces applied by the above mentioned bending moment, a plastic flow of the material of said band takes place, causing the pipe to be bent slightly around the centroidal axis of the heated section by slightly upsetting the material of the heated band at the inside of the bend and elongating it at the outside. When the desired degree of bend has been produced, burners 68 are shut off and master valve 122 is moved to release the hydraulic pressure from the hydraulic cylinders 22 and 34, and the heated circumferential band is allowed to cool, or is cooled as by water spray, air jets, etc., and regain sufficient rigidity to withstand the forces exerted by hydraulic cylinders 22 and 34 when the next circumferential band is heated. After the heated circumferential band has cooled a sufficient amount, burners 68 are lowered until they are opposite the next circumferential band to be heated and bent, and the process above described is repeated. Any determined number of circumferential bands may be heated and bent sequentially to give as a result any desired length of bend.

The application of a substantially pure bending moment to the pipe being bent gives several highly desirable advantages over the prior art methods of bending pipe by applying a cantilever or shear stress to one end of the pipe. The application of a cantilever or shear stress to the pipe sets up varying degrees of highly undesirable shear stresses along the pipe and furthermore the bending moment thus applied to the pipe varies from zero at the point where the force is applied to a maximum at the location where the pipe is held.

The application of a couple to one end of the pipe being bent results in substantially identical bending moments being established around the centroidal axis of each circumferential band of the pipe as it is heated. This makes possible extremely accurate control of the bending of each circumferential band of the pipe because the bending force is always the same regardless of the location on the pipe being bent. Furthermore, the application of a substantially pure bending moment to the end of the pipe results in the application of substantially pure tension and compression forces to the pipe and the substantial elimination of all shear stresses on the band being bent, and also the substantial elimination of undesirable component forces which tend to bend the pipe out of round and aggravate buckling, localized thinning, localized upsetting, and for other undesirable distortion.

However, even though the application of a substantially pure bending moment to the pipe results in the substantial elimination of forces which in themselves, bring about unwanted distortion of the pipe the selection of the proper width of circumferential band to be heated is extremely important inasmuch as buckling and localized upsetting, distortions produced by compression, and localized thinning, produced by tension, must be eliminated or reduced to a minimum. Theoretically, buckling due to inelastic instability of the heated circumferential band can be eliminated if the critical width of the circumferential bands heated is kept to a value less than the natural buckling wave length of the body at working temperature. As a matter of practice, however, buckling can be completely, or substantially, eliminated when the width of the heated band ranges from one-half to one-quarter, and less, the natural buckling wave length of the body at working temperature. When the width of the heated bands ranges from three-quarters to one-half the natural buckling wave length at working temperature buckling comes into evidence, but is not so pronounced as to render the bent pipe commercially unsatisfactory. When the width of the circumferential bands exceeds three-quarters of the natural buckling wave length at working temperature, buckling becomes more pronounced so that whether or not the bent pipe is commercially acceptable depends on the particular requirements of its use.

The undesired distortions due to non-uniform plastic flow, that is, localized upsetting, localized thinning out, and the like, are the results of many factors such as non-uniformity of the cross-section and width of the heated band subjected to the shaping forces, nonhomogeneity of the material, anisotropy of the material, percentage of deformation, etc. Consideration of results obtained in actual practice reveals that a relation exists between the width of the circumferential band heated, the thickness of said band, the percentage of deformation imparted to the pipe, and the amount of undesired distortion obtained. Furthermore, unwanted distortion increases with an increase in percentage deformation, the increase in unwanted distortion apparently varies as some complex function of the percentage deformation. It has been established that unwanted distortion can be completely, or substantially eliminated in every case if a proper ratio of critical width of the circumferential band heated to thickness of said band is chosen. For deformations in the order of 10% said ratio should approximate 4, for deformations in the order of 20% said ratio should approximate 3, for deformations in the order of 25% said ratio should approximate 2, and for deformations in the order of 30% said ratio should approximate 1. A ratio of 1 can usually be taken as a practical lower limit for with ratios materially less than 1 the critical widths required are generally so short as to be impractical.

While it is true in general that the shorter the critical width the better the results obtained from a purely shaping standpoint, excessively short critical widths tend to complicate the operation and sometimes render it impractical. Thus, such short critical widths may be chosen that the resulting circumferential bands are of such small dimensions that they are difficult if not impossible, to obtain; also, as is evident, the smaller the circumferential bands the larger the number of shaping steps necessary. When the above considerations are balanced, it is found that the best overall results are obtained when the circumferential bands are made of the maximum dimensions, within the limits set forth above, so that a maximum portion of the body is satisfactorily shaped during each step or increment of the operation.

By properly choosing the spacing between the shaping steps the effects of any residual unwanted distortion, which must at times be accepted because of limitations in the width of the circumferential band, can be completely eliminated or at least reduced to insignificant amounts. Since such residual unwanted distortions are repeated in each circumferential band and occur at substantially the same relative position in each of said bands, it has been found that if said bands are overlapped to such an extent that the unwanted distortions of one band unite to the unwanted distortions of the contiguous bands the effect of the unwanted distortion disappears. In operations involving deformations of the pipe in the order of 10%, little, if any, overlap is required for this purpose as there is seldom any residual unwanted distortions in this order of percentage deformation, so that for general purposes the spacing between steps can be made equal to the width of each circumferential band. In operations wherein deformations in the order of 12½% are contemplated, an overlap wherein each new band heated overlaps about 25% of the width of the preceding band is generally sufficient to eliminate the effects of residual unwanted distortions; when the deformations are in the order of 16⅔%, a 50% overlap usually is sufficient; when the deformations are in the order of 25%, an overlap of 75% will usually be found necessary. For deformations in excess of 25% it is seldom advisable to increase the amount of overlap beyond 75%, as by so doing, the amount of the pipe actually shaped in each step becomes so small that the operation tends to become excessively expensive and impractical.

As the pipe is bent as illustrated in Figure 2, a slight amount of shear force and an additional bending moment is superimposed upon the circumferential band being bent. This is caused by the weight of the bent pipe and the weight of stress applying member 36, shifting to one side of the center line of the pipe. However, by bending the pipe in a vertical position, these additional stresses are very slight by comparison with the stresses established in the circumferential band by reason of the couple imposed on the end of the pipe. For example, the stresses normally set up in the pipe by the action of the hydraulic cylinders 22 and 34, are approximately 8,000 pounds per square inch in compression on the inside of the bend, and 8,000 pounds per square inch in tension on the outside of the bend, whereas the additional stresses set up by the above mentioned off center weight of the pipe and apparatus amount only to about 100 pounds per square inch.

As the bend progresses, the forces applied by hydraulic cylinders 22 and 34 on stress applying member 36 depart from the parallel relationship that is present at the start of the operation due to the fact that these forces are applied between fixed points on base 10 of the apparatus which remains substantially horizontal and fixed points on stress applying member 36 which assumes an increasing angle with the horizontal as the bend progresses. However, unless the bend is one of extremely short radius, the forces applied by hydraulic cylinders 22 and 34 depart from parallelism only a slight amount which is not enough to create any adverse effect.

Whereas it is preferred that the pipe being bent be held in a vertical position, it will be appreciated by those skilled in the art that pipe can be bent by the method of the present invention when the pipe is held in a horizontal position, or at an angle to the horizontal. It will also be appreciated that the apparatus can be modified to bend pipe held horizontally, or at an angle to the horizontal.

A preferred form of indicating means for indicating the angle through which each circumferential band of pipe 58 is bent is illustrated diagrammatically in Figure 6. The indicating means of Fig. 6 is explained and disclosed in detail in copending application Serial No. 119,678, filed October 5, 1949. However, it may be briefly stated that if the bend being made in the pipe is circular, the angle included in the bend is directly proportional to the product of the arc of the bend and the reciprocal of the radius. Inasmuch as the burner travel in heating and bending one circumferential band of the pipe is equal to the width of that band the distance that the burner travels can be considered substantially the length of the arc, and therefore for any one burner position for any given radius of bend, there will be a proper angle, with respect to the horizontal, of stress applying member 36. The indicating means disclosed in Figure 6 comprises a unit 144 adapted to measure the angle that stress applying member 36 makes with the horizontal and compare that angle with the proper angle that should be obtained for any circumferential band of the pipe. Unit 144 is mounted on, and carried by, stress applying member 36. Unit 144 comprises a pendulum 146, connected by means of gears 148 and 150 to an electrical pick-off 152 so that movement of said pendulum 146 actuates said pick-off 152. Gears 148 and 150 are preferably so proportioned to each other that the pendulum movement transmitted thereby is magnified to increase the accuracy of unit 144. The output of the pendulum driven pick-off 152, which can be a synchro, or any other variable ratio transformer type of device, is connected by means of leads 154 to and compared with the output of a similar unit 156 which is positioned by motion of the ring burner to the predetermined angle for the particular radius of bend of the circumferential band under the burners. When there is a null or zero voltage between the two units 144 and 156, the pipe has been bent the correct amount, and as set forth above, burners 68 are shut off and the stresses applied by hydraulic cylinders 22 and 34 are discontinued.

Since certain changes may be made in the above process and apparatus without departing from the scope of the invention herein involved, it is intended that all matter contained in the above description or shown in the accompanying drawings shall be interpreted as illustrative and not limitative.

What is claimed is:

1. The method of bending pipe comprising the steps of holding a length of pipe at one side of a section thereof to be bent, rapidly heating a narrow circumferential band of said section to a predetermined substantially uniform temperature whereat the material of said band attains a degree of plasticity sufficient for uniform plastic flow upon application of bending forces thereto, applying a pair of substantially equal and parallel forces acting in opposite directions to each other to the pipe at the other side of said section at points outside the diameter of said pipe and in a plane substantially normal to a plane substantially at right angles to the centroidal axis thereof, said parallel forces comprising a couple of sufficient magnitude to cause substantially uniform plastic flow of the material comprising said heated circumferential band, and controlling said forces to bend said band a predetermined amount.

2. The method of bending pipe comprising the steps of holding a length of pipe at one side of a section thereof to be bent, rapidly heating a narrow circumferential band of said section to a substantially uniform predetermined temperature and maintaining the material comprising the areas of said pipe adjacent to said band relatively cool whereby the material comprising said band attains a predetermined degree of plasticity sufficient for uniform plastic flow upon application of bending forces thereto and the material comprising the areas adjacent said band remains relatively non-plastic, applying a pair of substantially equal and parallel forces to the pipe at the other side of said section, said parallel forces being of opposite senses and acting at points spaced outside the diameter of said pipe and in a plane substantially normal to a plane substantially at right angles to the centroidal axis thereof and comprising a couple of sufficient magnitude to cause a substantially uniform plastic flow of the heated material comprising said circumferential band, and controlling said forces to upset a portion of said circumferential band a predetermined amount and elongate another portion a predetermined amount whereby said band is bent around its centroidal axis.

3. An apparatus for bending pipe comprising, in combination, a base member, pipe holding means fixed to said base member, a stress applying member, pipe holding means fixed to said stress applying member, said two pipe holding means being adapted to hold a length of pipe to be bent between said base member and said stress applying member, a pair of force applying means interconnecting said base member and said stress applying member and adapted to apply substantially equal and parallel forces having opposite senses and comprising a substantially pure bending moment, to said stress applying member, said pair of force applying means being substantially spaced from and in the plane of said two pipe holding means, and means located between said base member and said stress applying member for heating predetermined circumferential bands on said length of pipe.

4. An apparatus for bending pipe comprising, in combination, a base member, pipe holding means operatively secured to said base member intermediate the ends thereof and adapted to hold one end of a length of pipe to be bent, a stress applying member, pipe holding means operatively secured to said stress applying member intermediate the ends thereof and adapted to hold the other end of said length of pipe and a pair of force applying means interconnecting the ends of said base member and the ends of said stress applying member.

5. An apparatus for bending pipe comprising, in combination, a base member including pipe holding means located intermediate the ends of said base member, a stress applying member spaced from said base member and including pipe holding means located intermediate the ends of said stress applying member, a frame member pivotally connected to one end of said base member, a force applying means connecting said frame member to one end of said stress applying member and a second force applying means connecting the other end of said base member to the other end of said stress applying member, both of said force applying means being substantially spaced from and in the plane of both of said pipe holding means.

6. An apparatus for bending pipe comprising, in combination, a base member with pipe holding means, a stress applying member with pipe holding means, said two pipe holding means being adapted to hold a length of pipe to be bent between said base and stress applying members, a pair of force applying means spaced from and in the plane of both of said pipe holding means and interconnecting said base and stress applying members and adapted to apply substantially equal forces acting in opposite directions and comprising a substantially pure bending moment, to said length of pipe, through said stress applying member, means located between said base and stress applying members for heating predetermined circumferential bands on said length of pipe to a temperature whereat they attain a predetermined degree of plasticity and the material thereof is capable of uniform plastic flow when subjected to the forces exerted by said force applying means, means to provide relative movement between said pipe and said means for heating, and means for indicating the amount of deformation accomplished in said length of pipe by reason of said plastic flow.

7. An apparatus for bending pipe comprising in combination, an elongated base member, pipe holding means fixed to said base member intermediate the ends thereof, an elongated stress applying member, pipe holding means fixed to said stress applying member intermediate the ends thereof, said pipe holding means adapted to position a pipe length inwardly of the ends of said base member and of said stress applying member, and means interconnecting the ends of said base member and said stress applying member for applying equal and parallel forces acting in opposite directions in the plane of said pipe holding means and outwardly of the diameter of the pipe positioned therein.

FREDERICK A. FICHTMUELLER.

REFERENCES CITED

The following references are of record in the file of this patent:

UNITED STATES PATENTS

| Number | Name | Date |
| --- | --- | --- |
| 142,018 | Holmes | Aug. 19, 1873 |
| 577,083 | Tallmage | Feb. 16, 1897 |
| 606,785 | Kemp | July 5, 1898 |
| 697,604 | Bradley | Apr. 15, 1902 |
| 783,716 | Brinkman | Feb. 28, 1905 |
| 784,101 | Brinkman | Mar. 7, 1905 |
| 785,787 | Zeh | Mar. 28, 1905 |
| 913,004 | Gordon | Feb. 23, 1909 |
| 1,345,386 | Meyers | July 6, 1920 |
| 2,316,049 | Connor | Apr. 6, 1943 |
| 2,428,825 | Arnoldy | Oct. 14, 1947 |
| 2,433,055 | Linden | Dec. 23, 1947 |
| 2,480,774 | Rossheim | Aug. 30, 1949 |

FOREIGN PATENTS

| Number | Country | Date |
| --- | --- | --- |
| 208,465 | Great Britain | Dec. 20, 1923 |
| 408,825 | Great Britain | Apr. 19, 1934 |
| 505,866 | Great Britain | May 18, 1939 |
| 512,345 | Great Britain | Sept. 1, 1939 |